(No Model.)
J. W. GRUBBS.
PLANTER ATTACHMENT FOR PLOWS.
No. 527,683.　　　　　　　　Patented Oct. 16, 1894.
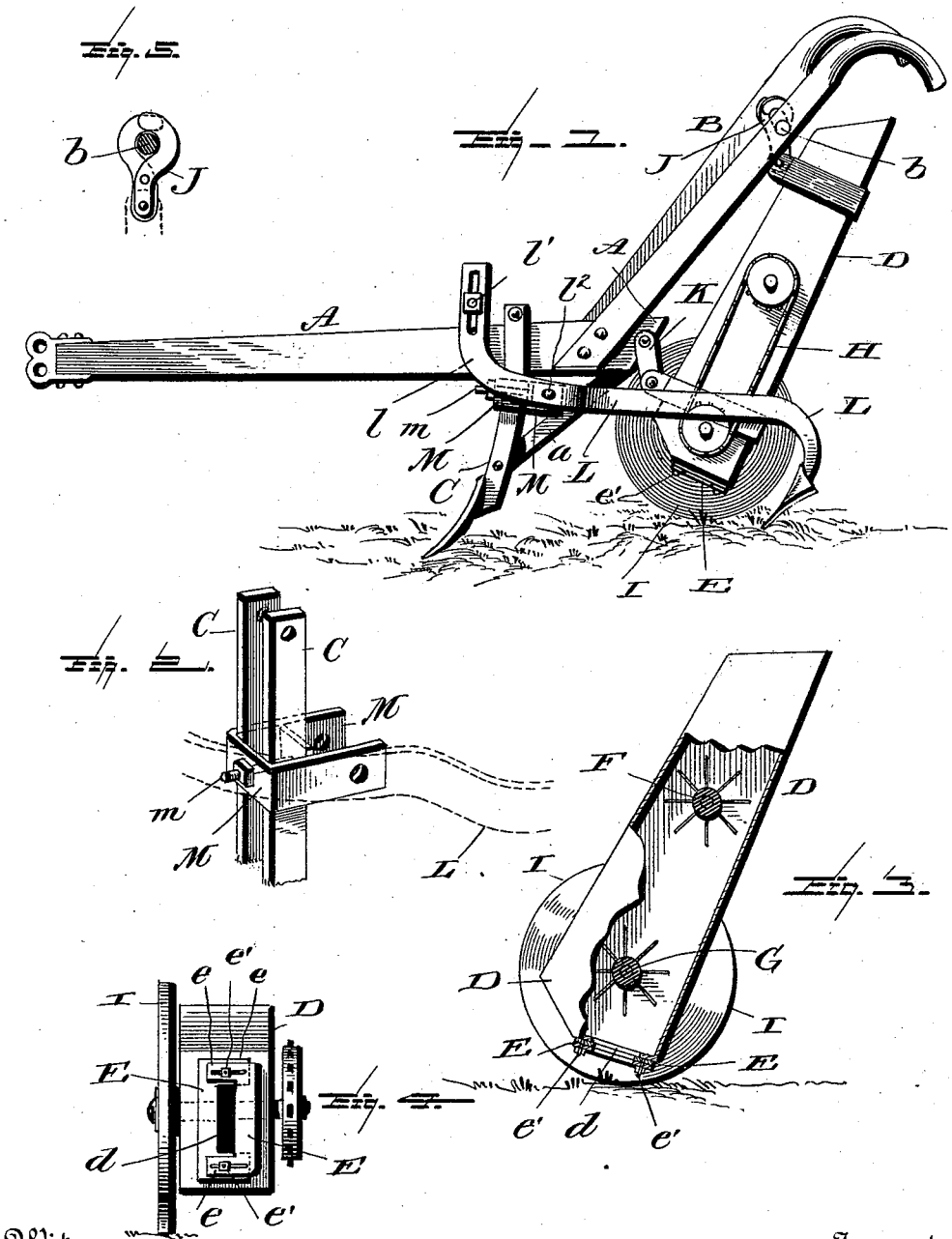
Witnesses:
L. C. Hills
A. L. Hough
Inventor:
John W. Grubbs,
by Franklin H. Hough,
Attorney

UNITED STATES PATENT OFFICE.

JOHN WILLIS GRUBBS, OF FAIR PLAY, SOUTH CAROLINA.

PLANTER ATTACHMENT FOR PLOWS.

SPECIFICATION forming part of Letters Patent No. 527,683, dated October 16, 1894.

Application filed February 2, 1894. Serial No. 498,890. (No model.)

*To all whom it may concern:*

Be it known that I, JOHN WILLIS GRUBBS, a citizen of the United States, residing at Fair Play, in the county of Oconee and State of South Carolina, have invented certain new and useful Improvements in Planter Attachments for Plows; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a planter attachment for plows of ordinary construction having an iron plow stock.

The object of the improvement is the provision of planting and covering mechanism which can be readily applied to a plow and capable of adjustment to plant shallow or deep to suit the nature of the soil, climate and kind of seed to be planted.

The improvement consists of the novel features and peculiar construction of the parts which will hereinafter be more fully described and claimed and which are shown in the accompanying drawings, in which—

Figure 1 is a side view of the plow equipped with the planting attachment. Fig. 2, is a detail view of the cuff showing the manner of attaching it to the plow stock. Fig. 3, is a detail view of the hopper, parts being broken away to show the stirrers or agitators. Fig. 4 is a bottom view of the hopper showing the cut off plates and Fig. 5 is a view of one of the shackles.

The beam A, handles B braced by the cross bar $b$, and the plow stock C stayed by brace $a$, are of usual construction being parts of an ordinary plow.

The hopper D is long and narrow and provided in its lower end with the discharge opening $d$ which is regulated by the cut off plates E having slotted arms $e$ through which pass bolts $e'$ to secure the said plates to the hopper and together in the required position. Rotary stirrers F and G are journaled in the hopper at different heights and have sprocket pinions on the projected ends of the journals around which pass a sprocket chain H to transmit motion from one to the other. A ground wheel I mounted on the journal of the lower stirrer, sustains the hopper and is the means for operating the stirrers. The shackles J and K, the former mounted on the cross-bar $b$, the latter on the end of the beam A, are connected by bolts or pins to suitable irons on the hopper. These shackles admit of the hopper having a limited vertical movement independent of the plow so that the ground wheel I may travel on the ground at all times and yet admit of the vertical movement of the plow beam incident to plowing.

The beams L carrying the covering shovels have their forward ends $l$ curved upward and slotted and connected by a bolt $l'$. These beams are pivotally connected by a bolt $l^2$ to the cuff M on the plow stock. The cuff M embraces the front edge of the sides of the plow stock and is adjustably connected to the latter by bolt $m$ which passes through the closed end of the cuff and between the separated and parallel portions of the said plow stock. The head of the bolt $m$ engages with the rear edge of the plow stock and the threaded end passes through the closed end of the cuff and receives a hand nut by means of which the said bolt is tightened and the cuff secured in the adjusted position. On moving the cuff M up or down on the plow stock the relative height of the pivotal support of the beams L is adjusted and the covering shovels raised or lowered as desired. The same result can be produced by loosening the bolt $l'$ and turning the beams on the pivot bolt $l^2$. This adjustment also changes the pitch of the shovel. By a proper adjustment of the cuff M and the beams about the pivot bolt $l^2$ the covering shovels can be given any pitch and relative height that may be required.

The beams L and the hopper D can be readily detached when it is required to use the plow for tilling the soil and can be easily placed in position for planting.

What I claim is—

1. The combination with the ordinary plow, and a planting mechanism attached thereto, of a cuff vertically adjustable on the plow stock, beams provided with covering shovels pivotally attached to the said cuff, and means for adjusting the said beams on their pivot, substantially as shown and described.

2. The herein specified planting and covering mechanism to be attached to an ordinary plow, consisting of a hopper having rotary agitators one operated by the ground wheel shaft, the other by a sprocket wheel and chain connection with said ground wheel shaft, shackles connecting the hopper with the plow and admitting of an independent vertical movement of said hopper, a cuff vertically adjustable on the plow stock, beams pivotally connected with the cuff, and having their forward ends curved upward and slotted, and a bolt connecting the slotted ends of the beams, all substantially as shown and described.

In testimony whereof I affix my signature in presence of two witnesses.

JOHN WILLIS GRUBBS.

Witnesses:
C. A. BURTON,
B. H. CROSS.